Nov. 5, 1957     H. W. COLE, JR     2,812,044
SELF-LOCKING SHAFT ACTUATOR
Filed Aug. 18, 1955
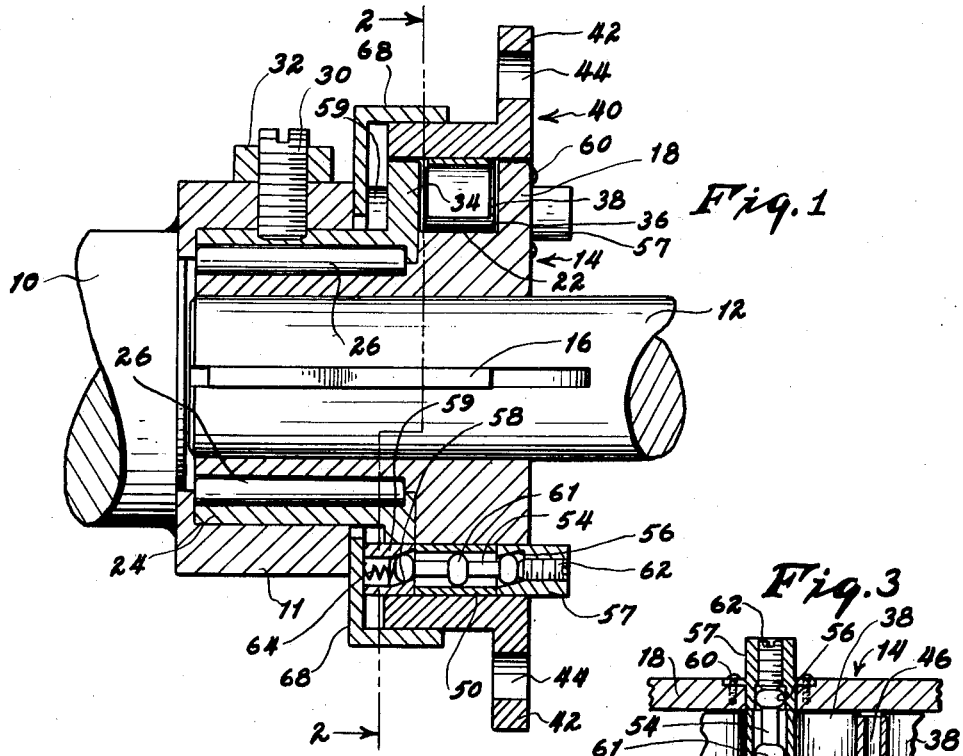
Fig.1
Fig.3
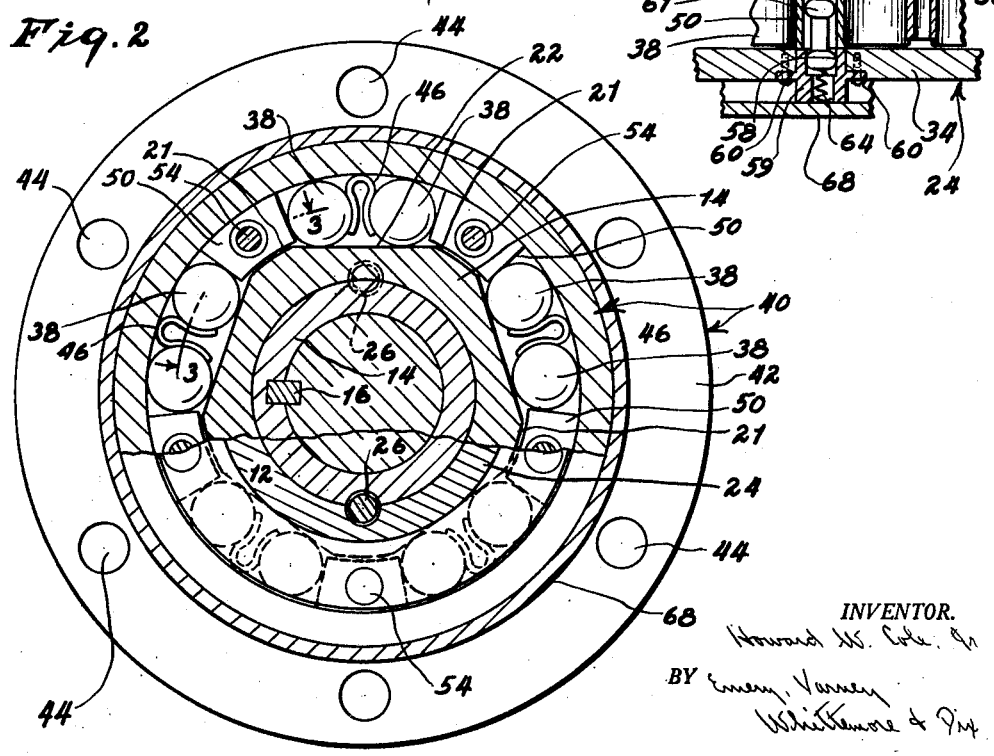
Fig.2
INVENTOR.
Howard W. Cole, Jr.
BY Emery, Varney,
Whittemore & Dix
ATTORNEYS

# United States Patent Office 2,812,044
Patented Nov. 5, 1957

2,812,044

SELF-LOCKING SHAFT ACTUATOR

Howard W. Cole, Jr., Mountain Lakes, N. J.

Application August 18, 1955, Serial No. 529,152

13 Claims. (Cl. 192—8)

This invention relates to a locking device and is intended primarily for use as a shaft locking device. More particularly, the invention relates to apparatus which will transmit rotary motion from a primary mechanism to a secondary mechanism, but which locks to prevent the secondary mechanism from transmitting motion back to the primary mechanism.

It is an object of the invention to provide an improved actuator, of the character indicated, for transmitting angular or rotary motion from a primary to a secondary mechanism, and more especially from a primary shaft to a secondary shaft.

The principal improvement in this invention, as compared with actuators of the prior art, is the feature of the construction whereby the load on the locking elements is relieved by the force which moves the mechanism in response to actuation of the primary shaft. Prior devices were not practical for use with heavy loads because the locking elements jammed so tightly that they could not be released by manual operation of the primary shaft or actuator. This greatly limited the applications for which the locking devices were suitable.

It may be said to be another object of this invention to provide a connection for joining two shafts, or other rotary elements, with locking means for preventing rotation of the primary shaft by the secondary shaft and with automatic means for releasing the load on the locking means upon operation of the primary shaft or actuator.

Other objects, features and advantages of the invention will appear or be pointed out as the description proceeds.

In the drawing, forming a part hereof, in which like reference characters indicate corresponding parts in all the views:

Figure 1 is a vertical, sectional view through locking mechanism made in accordance with this invention;

Figure 2 is a sectional view taken on the line 2—2 of Figure 1; and

Figure 3 is a fragmentary sectional view taken on the line 3—3 of Figure 2.

Figure 1 shows a primary shaft 10 rigidly connected to a sleeve 11. The primary shaft 10 transmits rotary or angular movement, about the longitudinal axes of the shaft 10, to a secondary shaft 12. This secondary shaft 12 is connected to a load which is to be controlled from the primary shaft 10.

The secondary shaft 12 is connected to an inner clutch element 14 by a key 16. This inner clutch element 14 has a cylindrical end flange 18, and has a face with alternating cylindrical surfaces 21 and flat surfaces 22, the latter serving as cam faces.

The other end of the inner clutch element 14 extends into an actuator 24 which fits over a cylindrical outside surface of the inner clutch element 14. There are confronting complementary recesses in the outside and inside surfaces of the clutch element 14 and the actuator 24, respectively, and there are dowels 26 located in the spaces provided by these recesses. These dowels 26 fit loosely in the spaces so that they provide some lost motion before transmitting rotary or angular movement of the actuator 24 to the inner clutch element 14.

The actuator 24 is connected to the sleeve 11 by a set screw 30 provided with a lock nut 32. This set screw 30 is merely representative of a rigid connection between the sleeve 11 and the actuator 24.

The actuator 24 has a flange 34 extending parallel to the end flange 18 of the inner clutch element 14. These flanges 18 and 34 are spaced from one another so as to enclose chambers 36 in which there are located locking elements or rollers 38. Balls can be used instead of rollers 38, but the rollers have the advantage of larger contact areas with the faces of the clutch elements and this makes it possible for the invention to carry heavier loads when equipped with rollers as the locking elements.

There is an outer clutch element 40 with inside surfaces that provide bearings for the circumferential faces of the flanges 18 and 34. The outer clutch element 40 has a flange 42 with openings 44 for receiving bolts or other fastening means which attach the flange 42 to a bulkhead or other fixed structure.

There are two rollers or locking elements 38 in each of the compartments 36, as clearly shown in Figure 2; and these rollers are urged in opposite directions by a spring 46 compressed between the rollers 38. There are blocks 50 separating the different roller compartments from one another. These blocks 50 have outside faces which fit against the cylindrical inside face of the outer clutch element 40; and the inside faces of the blocks 50 are shaped to fit the cylindrical bearing surfaces 21 of the inner clutch element 14.

The blocks 50 are free to move angularly about the axis of the actuator, but only for a limited distance with respect to the cylindrical surfaces 21 because of the connections of the blocks 50 to the actuator 24 and inner clutch 14, as will be explained in connection with Figure 3.

A lever 54 extends through each of the blocks 50. One end of the lever 54 is held in a recess 56 in a fitting 57 (Figure 3); and the other end of the lever 54 is held in a recess 58 of a fitting 59. The fittings 57 and 59 are secured to the flanges 18 and 34, respectively, by fastenings 60. The center portion of the lever 54 is of larger diameter to provide a bearing 61 in the block 50. This center bearing 61 is preferably a zone of a sphere.

The diameter of the lever 54 beyond both ends of the center bearing 61 is substantially smaller than the diameter of the opening through the block 50 so that the lever 54 has a limited rocking movement on the zone bearing 61 before the rest of the lever 54 strikes against the sides of the opening in the block 50.

The end portions of the lever 54, which are located within the recesses 56 and 58, are of enlarged diameter and curved to provide bearing surfaces that are zones of a sphere, and similar to bearing 61. The recesses 56 and 58 are preferably at an angle to the axis of rotation of the clutch element 14 and the actuator 11. In the illustrated construction this angle is approximately 15 degrees. There is a set screw 62 threaded through the end of each of the fittings 57 into contact with the end of the lever 54. There is a spring 64 in a socket at the end of the recess 58 in the fitting 59. A cover 68 extends across the ends of the fittings 59 and holds the springs 64 compressed against the ends of the levers 54.

The spring 64 urges each lever 54 toward the sloping faces of the recesses 56 and 58 and toward the set screw 62. By advancing and retracting the set screw, the adjacent lever 50 can be moved one way or the other along the sloping faces of the recesses 56 and 58. In this way the apparatus can be adjusted for minimum backlash and can be readjusted from time to time, if necessary, to compensate for wear. For example, if the set screw 62 is rotated in a direction to thrust the lever 54 toward the left in Fig. 1, then the sloping faces of the recesses 56 and 58 push the lever 54 downwardly at both ends and into firm contact with the bottom surface of the opening through the block 50. This eliminates play between the blocks 50 and the levers 54.

When the primary shaft 10 of the actuator turns to move the flange 34 toward the left in Figure 3, the lever 54, block 50 and flange 18 of the inner clutch element may move as a unit with the flange 34 if the rollers 38 are not tightly jammed so that they prevent the flange 18 of the inner clutch elements from moving. If the flange 18 is held against movement by the force with which the rollers are jammed against the stationary outer clutch element 40, then the force urging the flange 34 toward the left in Figure 1 exerts an effort to rock the lever 54 about its bearing surface on the recess 56 as a fulcrum. This effort is in a direction to force the block 50 toward the left in Figure 3 and the force exerted is twice as great as the force moving the flange 34 toward the left; the extra force being obtained by virtue of the leverage which the flange 34 has in acting against the lower end of the lever 54. The resistance of the block 50 to movement sets up a reaction force urging the inner clutch element 14 to move toward the right in Figure 3. This reaction results from the force of the lever 54 operating about the center bearing 61 as a fulcrum. There are set up, therefore, opposing forces, one of which urges the block 50 and the roller 38, which is against the left-hand face of the block 50, to move in a direction to release the rollers from locked condition; and the other of which urges the inner clutch element 14 to move the cam faces in a direction to release the actuator from its locked condition. Thus the load on the locking elements 38 is released prior to the operation of the actuator.

In like manner, operation of the primary shaft or actuator 24 to move the flange 34 toward the right in Figure 3 will urge the block 50, and the roller 38 on the right-hand side of the block 50 in one direction, and the clutch element 14 and its cam faces in the other direction, to release the load on the rollers prior to movement of the inner clutch element 14 toward the right.

It will be understood, by reference to Figure 2, that there are levers 54 extending through blocks 50 between every roller compartment of the actuator. The actuator 24 moves independently of the inner clutch element 14 for only the limited angle of movement required to take up the lost motion provided by the loose fit of the dowels 26 in the spaces provided for these dowels by the confronting recesses in the adjacent faces of the actuator 24 and in the clutch element 14. This lost motion is sufficient to permit actuation of the levers 54 to relieve the load on the rollers 38 so that the inner clutch element 14 is free to move angularly with the movement of the actuator 24 as soon as the lost motion around the dowels 26 has been taken up.

The springs 46 hold the rollers 38 in positions to contact the inside cylindrical surface of the outer clutch element 40 and the cam face 22 of the inner clutch element 14 at the same time. Thus either of the rollers 38, in each compartment of the actuator, is in position to jam immediately to prevent movement of the inner clutch element 14 in the direction which causes that particular roller to lock the actuator. For example, clockwise movement of the cam face 22 in Figure 2 immediately locks the left-hand rollers 38 of each compartment. Conversely, counter-clockwise movement of the inner clutch elements 14 causes the cam faces 22 to immediately lock all of the right-hand rollers 38 in each of the roller compartments of the actuator.

This movement of the inner clutch element 14, to lock the actuator, must be instigated by a force applied to that clutch element 14 to move that clutch element without moving the blocks 50. Movement of the inner clutch element 14, in either direction, by actuation of the primary actuator 24 will not cause the rollers 38 to lock because such movement of the inner clutch element is preceded by movement of the blocks 50 which push the appropriate rollers 38 away from their positions where each roller has simultaneous contact with its cam face 22 and the cylindrical face of the fixed outer clutch element 40.

From the foregoing description, it will be apparent that this invention provides an actuator for connection between two aligned shafts, and for similar situations, and through which rotation can be imparted from one shaft to the other in either direction without interference by the locking mechanism of the actuator; but in which the other shaft cannot turn in either direction when the force tending to turn it is a force applied from the load end of the shaft. The actuator of this invention is capable of carrying heavy loads which cause the locking elements to be wedged in locking position under great force; yet the force required to turn the actuator is comparatively small because the first movement of the actuator releases the load on the locking elements or rollers by thrusting the rollers in one direction and the cam faces which lock them in the opposite direction. This eliminates the force maintaining the rollers in their locked positions. This release mechanism not only operates with reaction forces in opposite directions to relieve the locking elements of their load, but it effects this operation with the mechanical advantage obtained by the levers 54.

The preferred embodiment of this invention has been illustrated and described, but changes and modifications can be made and some features can be used in different combinations without departing from the invention as defined in the claims.

What is claimed is:

1. Apparatus for transmitting rotary motion from a primary shaft to a secondary shaft and for automatically locking against motion inaugurated from the secondary shaft, said apparatus comprising a primary actuator rotatable about an axis, a fixed clutch element, a second clutch element rotatable about an axis, a first operating connection between the primary actuator and the second clutch element, said first operating connection having lost motion therein, a plurality of cam faces on the second clutch element at angularly spaced locations around the axis of the second clutch element, locking elements between the cam faces and a surface of the fixed clutch element, and at least one other operating connection between the primary actuator and the second clutch element, said other operating connection being independent of the first operating connection and including a lever in position to thrust the cam faces and locking elements in opposite directions in response to movement of the primary actuator.

2. The apparatus described in claim 1 and in which there are in addition to said other operating connection a plurality of similar other operating connections between the primary actuator and the second clutch element, said other operating connections being at angularly spaced locations around the axis of rotation of one of the parts which they connect, and in which primary actuator is directly connected with said devices so that said devices operate to unload the locking elements before the lost motion is taken up between the primary actuator and the second clutch element.

3. The apparatus described in claim 2 and in which there are blocks between the fixed clutch element and the second clutch element at angularly spaced locations around the axis of the second clutch element and between the different cam faces on the second clutch element, said blocks dividing the space between the clutch elements into a plurality of compartments for housing the locking elements, each of the blocks having a surface for contact with the locking element in an adjacent compartment, said other operating connections passing through said blocks and contacting therewith for imparting thrust to said blocks and through the blocks to the locking elements.

4. The apparatus described in claim 1 and in which said other operating connection between the primary actuator and the second clutch element for relieving the load on the locking elements is operated by the first part of the movement of the actuator before the lost motion is taken up, and in which said other operating connection includes a lever operated by the actuator and reacting in opposite directions against the locking elements and the second clutch element.

5. Apparatus for transmitting rotary motion from a primary shaft to a secondary shaft and for automatically locking against motion inaugurated from the secondary shaft, said apparatus comprising a rotatable primary actuator, a fixed clutch element having a cylindrical face, a second clutch element rotatable about the axis of said cylindrical face, a plurality of cam faces on the second clutch element, and at angularly spaced locations around the axis of rotation of the second clutch element, locking elements between the cam faces and the cylindrical face of the fixed clutch element, resilient means urging the locking elements into simultaneous contact with the cam faces and the cylindrical face, a lost-motion connection between the primary actuator and the second clutch element, and means for relieving the load on the locking elements before the lost motion is taken up, said means comprising a plurality of devices located at angularly spaced regions around said axis, each of the devices extending between said cylindrical face and the surface of the second clutch element having the cam faces thereon, each of said devices having a face that confronts a surface of the second clutch element and another face on the other side of said device confronting a surface of one of the locking elements, and means to move the devices in directions to press the faces on opposite sides of each device simultaneously against the confronting surfaces of the second clutch element and the locking elements, respectively, whereby a thrust against one of the elements produces a reaction against the other to unlock the apparatus.

6. The apparatus described in claim 5 and in which the resilient means comprise springs compressed against the circular locking elements.

7. The apparatus described in claim 5 and in which there are blocks between the fixed and the second clutch elements at angularly spaced locations between the cam faces and in position to divide the space between the clutch elements into a plurality of different compartments, each of the blocks having a face in contact with a locking element of an adjacent compartment and said blocks comprising a part of the operable connections between the locking elements and the devices for unlocking the actuator during the taking up of the lost motion between the primary actuator and the second clutch element.

8. The apparatus described in claim 7 and in which all of the cam faces are located around a common length of the axis of rotation of the second clutch element, and there are two locking elements located above each of the cam faces at opposite ends of the compartment of that cam face, and the resilient means urging the locking elements into simultaneous contact with the cam faces and the face on the fixed clutch element are springs compressed between two locking elements in each compartment.

9. Apparatus for transmitting rotary motion from a primary to a secondary shaft and for locking automatically against motion inaugurated from the secondary shaft, said apparatus comprising a primary actuator rotatable about an axis, an outer clutch element at a fixed location and having an inside cylindrical face, an inner clutch element rotatable about the same axis as the primary actuator and having cam faces at angularly spaced locations around its circumference in position to confront the cylindrical face of the outer clutch element, the cam faces on the inner clutch element being angularly spaced from one another by bearing surfaces having their axes of curvature coincident with the axis of the cylindrical face of the outer clutch element, a plurality of blocks located between the bearing surfaces of the inner clutch element and the cylindrical face of the outer clutch element and dividing the space between the inner and outer clutch elements into a plurality of compartments bounded on their inner sides by the cam faces of the inner clutch element, locking elements including rollers located in the compartments adjacent to the blocks and in simultaneous contact with the cam faces on the inner clutch element and the cylindrical face of the outer clutch element, a lost-motion connection between the primary actuator and the inner clutch element for transmitting rotation of the primary actuator to the inner clutch element, means for relieving the load on the rollers during the taking up of the lost motion connection, said means including levers extending through the blocks and having fulcrum bearings in the blocks on which the levers can rock, other bearings connecting corresponding ends of the levers on one side of the blocks with the primary actuator, and other bearings connecting the corresponding opposite ends of the levers with the inner clutch element whereby motion of the primary actuator in one direction moves the levers to thrust the blocks and the inner clutch element with the cam faces in opposite directions to relieve the load on the rollers.

10. The apparatus described in claim 9 and in which there are two rollers in each of the compartments and the rollers in each compartment are urged toward opposite ends of the compartment by a spring compressed between the rollers and curved to fit the rollers so that the rollers maintain the spring in position in the compartment.

11. In a self-locking actuator that has circular locking elements angularly spaced around an inner clutch element, with cam faces thereon, and an outer clutch element having a surface against which the locking elements are jammed by the cam faces, the inner clutch element having a shoulder projecting beyond the cam faces and across the ends of the locking elements, a plurality of blocks at angularly spaced locations around the inner clutch element and in positions to contact with the locking elements to move them in unison with the inner clutch element to prevent jamming of the locking elements, an actuator for moving the blocks, and means connecting the actuator with the blocks including levers extending through openings in the blocks, the forward ends of the levers extending beyond the blocks into sockets in the shoulder of the inner clutch element, and the rearward ends of the levers extending into sockets in the actuator, and a fulcrum for each lever in the block through which the lever extends.

12. The actuator structure described in claim 11 and in which the levers extend substantially parallel to an axis of rotation of the inner clutch element, and in which the sockets have longitudinal axes extending at an angle to said axis of rotation to provide sloping surfaces.

13. The actuator structure described in claim 12, and in which the actuator and the inner clutch elements include fittings in which the sockets are located, and there are means for adjusting the levers in the direction of their length to change the locations at which they contact with the sloping surfaces of the sockets to adjust for back lash and wear in the actuator structure.

References Cited in the file of this patent
UNITED STATES PATENTS 2,559,960    Houplain _____ July 10, 1951

FOREIGN PATENTS 888,934    France _____ Sept. 20, 1943